Sept. 28, 1954  J. W. EDWARDS  2,690,015
HAND LEVELING AND PLUMBING TOOL
Filed June 19, 1952

INVENTOR.
JAMES W. EDWARDS,
BY
ATTORNEY.

Patented Sept. 28, 1954

2,690,015

UNITED STATES PATENT OFFICE 2,690,015

HAND LEVELING AND PLUMBING TOOL

James W. Edwards, Lomita, Calif.

Application June 19, 1952, Serial No. 294,331

2 Claims. (Cl. 33—70)

This invention relates to a hand leveling and plumbing tool, whereby certain parts of a structure can be either leveled or plumbed by use of this hand tool.

An object of my invention is to provide a simple and easily operated hand tool, by means of which a part of a structure can be either leveled or plumbed, or both, as may be necessary.

A feature of my invention is to provide a plumb and leveling tool of the character stated, in which the plumb line, when moved from its true vertical position, passes over a scale, and the amount of deviation from the true vertical position can be read on that scale.

Another feature of my invention is to provide a hand leveling and plumbing tool of the character stated, which is incorporated in a telescope, thus providing a means to magnify a target or structure, enabling that target or structure to be more effectively leveled or plumbed.

Other objects, advantages and features of invention may appear from the accompanying drawing, the subjoined detailed description and the appended claims.

Figure 1:
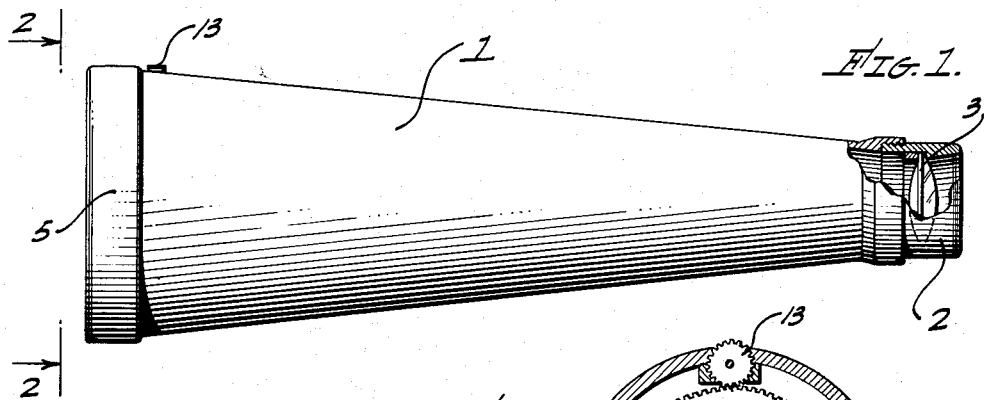
Figure 1 is a side elevation of my hand leveling and plumbing tool with parts broken away to show interior construction.
Figure 4:
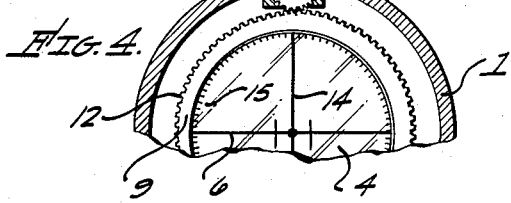
Figure 4 is a fragmentary vertical elevation taken from the line 4—4 of Figure 3.
Figure 2:
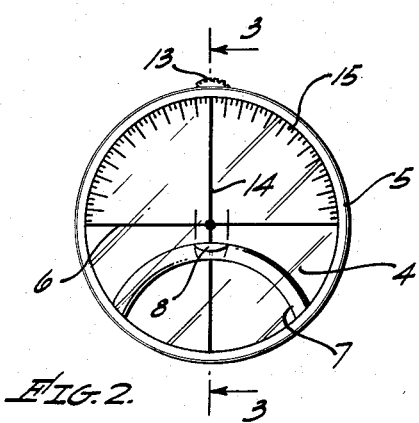
Figure 2 is an end view of the same taken from the line 2—2 of Figure 1.
Figure 5:
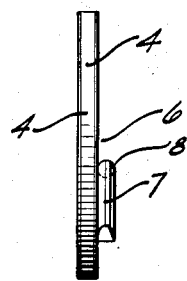
Figure 5 is a side elevation of the front lens.
Figure 3:
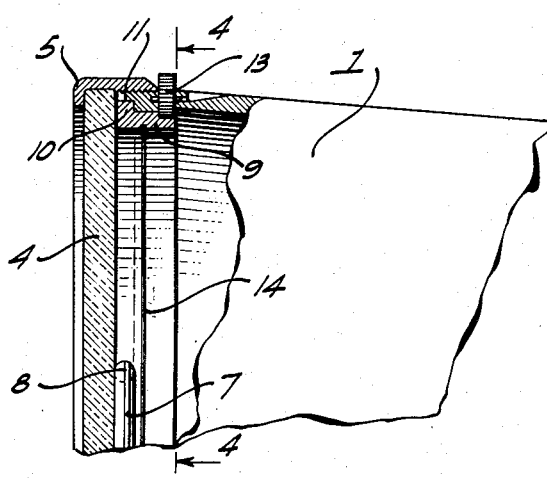
Figure 3 is a fragmentary sectional view taken on the line 3—3 of Figure 2.

Referring more particularly to the drawing, the numeral 1 indicates an elongated telescopic housing, at one end of which an eye piece 2 is mounted, and this eye piece includes the usual magnifying lens 3 of an appropriate type such as the lens shown in Patent No. 1,714,827, dated May 28, 1929, which permits the simultaneous viewing of both close and distant objects. At the end of the telescope 1 opposite the eye piece 2, I provide a flat glass plate or lens 4 which closes the front end of the telescope, and is held in position by a ferrule or ring 5 which screws onto the end of the telescope. The plate 4 has a horizontal line 6 scribed or etched thereon, and a bubble tube 7 is also fixedly secured to the back surface, or adjacent the back surface of this lens or plate.

It will be evident that when the bubble 8 within the bubble tube is brought to its center position, then the line 6 will be horizontal. The lens or plate 4 is fixed with relation to the telescope 1 and does not rotate, except as it may be rotated by rotation of the entire telescope. A ring 9 is rotatably mounted on the inside of the telescope 1 and immediately back of the plate 4. This ring may be formed with a flange 10 which fits in an appropriate groove 11 in the end of the telescope 1, thus holding the ring 9 in position. The plate 4 will keep the ring from moving forwardly in the telescope 1.

Gear teeth 12 are cut on the periphery of the ring 9 and a gear 13 is journaled in the telescope 1 and engages the teeth 12, thus enabling the ring 9 to be rotated when the gear 13 is manually rotated by the operator. A plumbing line or wire 14 is secured to the ring 9 and extends diametrically across this ring. The plumbing line 14 intersects the center of the line 6, that is, it intersects the center as observed from either the front or the rear. The plate 4 may be calibrated as shown at 15 to enable the operator to read the amount of vertical misalignment of a structure when the plumbing line 14 is rotated either to the right or to the left.

In operation the operator holds the telescope 1 in a horizontal position and rotates the telescope until the bubble 8 is in the center, at which time the line 6 will be horizontal. Holding the telescope 1 in this position the plumbing line 14 is now brought into alignment with the vertical structure or edge on the building which it is desired to plumb. If necessary, the ring 9 is rotated through the gear 13 until the line 14 is in alignment with the edge or part of the structure. By reading the scale 15 it is then possible to determine how far the structure or portion thereof is off of plumb. The telescope 1 can be supported on a tripod or against any fixed object, if desired.

Having described my invention, I claim:

1. A hand leveling and plumbing tool comprising a telescope housing, an eye piece at one end of said housing said eye piece including an optical lens, a glass plate on the other end of said housing, a horizontal line on said plate, a level tube adjacent said plate, a ring adjacent said plate, means rotatably mounting said ring in the telescope, and a vertical plumbing line mounted on said ring, and a manually rotatable gear engaging said ring to rotate said ring within the telescope.

2. A hand leveling and plumbing tool comprising a telescope housing, an eye piece mounted in one end of said housing, said eye piece including an optical lens, a glass plate mounted at the other end of said housing from said eye piece, a horizontal line on said plate, a level tube mounted on said plate, a ring rotatably mounted within said telescope housing and back of said plate, a vertical wire mounted in said ring and a manually operable gear mounted in the telescope and engaging said ring to rotate said ring within the telescope.

References Cited in the file of this patent

UNITED STATES PATENTS

| Number | Name | Date |
|---|---|---|
| 1,207,418 | Lazarte | Dec. 5, 1916 |
| 1,380,333 | Rosales | May 31, 1921 |
| 1,714,827 | Torka et al. | May 28, 1929 |
| 2,527,189 | Kittelson | Oct. 24, 1950 |